(12) United States Patent
Van Praet

(10) Patent No.: US 10,982,749 B2
(45) Date of Patent: Apr. 20, 2021

(54) METHOD FOR INSTALLING A TRANSMISSION AND SHAFTSEAT APPLIED THEREBY

(71) Applicant: ATLAS COPCO AIRPOWER, NAAMLOZE VENNOOTSCHAP, Wilrijk (BE)

(72) Inventor: Stephan Willem Van Praet, Wilrijk (BE)

(73) Assignee: ATLAS COPCO AIRPOWER, NAAMLOZE VENNOOTSCHAP, Wilrijk (BE)

( * ) Notice: Subject to any disclaimer, the term of this patent is extended or adjusted under 35 U.S.C. 154(b) by 191 days.

(21) Appl. No.: 15/762,596

(22) PCT Filed: Sep. 27, 2016

(86) PCT No.: PCT/BE2016/000047
§ 371 (c)(1),
(2) Date: Mar. 23, 2018

(87) PCT Pub. No.: WO2017/059501
PCT Pub. Date: Apr. 13, 2017

(65) Prior Publication Data
US 2018/0266561 A1 Sep. 20, 2018

(30) Foreign Application Priority Data
Oct. 7, 2015 (BE) .................................. 2015/5638

(51) Int. Cl.
*F16H 57/023* (2012.01)
*F16J 15/322* (2016.01)
(Continued)

(52) U.S. Cl.
CPC ............ *F16H 57/023* (2013.01); *B60K 17/00* (2013.01); *F04C 18/16* (2013.01); *F04C 29/005* (2013.01);
(Continued)

(58) Field of Classification Search
CPC .... F16J 15/3232; F16J 15/3204; F16J 15/322; F16J 15/3268; F16H 1/06; F16H 57/025; F16H 57/029; F16H 27/023
(Continued)

(56) References Cited

U.S. PATENT DOCUMENTS 4,684,330 A 8/1987 Andersson et al.
4,834,397 A * 5/1989 Shimasaki ........... F16J 15/3204
277/564
(Continued)

FOREIGN PATENT DOCUMENTS

CN 2417087 Y 1/2001
CN 1496447 A 5/2004
(Continued)

OTHER PUBLICATIONS

International Search Report dated Aug. 2, 2017 on PCT/BE2016/000047.
(Continued)

*Primary Examiner* — Christopher J Besler
(74) *Attorney, Agent, or Firm* — Bacon & Thomas, PLLC

(57) ABSTRACT

Method for installing a transmission between a drive with a driveshaft and a load with a driven shaft, whereby this transmission includes a housing and at least a drive gear and a driven gear, wherein the method consists of first affixing the transmission over the driveshaft and fastening the housing of the transmission to the housing of the drive and then affixing a shaft seal over the driveshaft.

19 Claims, 4 Drawing Sheets

(51) Int. Cl.

| | | |
|---|---|---|
| *F16J 15/3268* | (2016.01) | |
| *F16J 15/3232* | (2016.01) | |
| *F16H 1/06* | (2006.01) | |
| *F16H 57/025* | (2012.01) | |
| *F16H 57/029* | (2012.01) | |
| *F04C 29/00* | (2006.01) | |
| *F04C 18/16* | (2006.01) | |
| *B60K 17/00* | (2006.01) | |
| *F16J 15/3204* | (2016.01) | |

(52) U.S. Cl.
CPC ............ *F04C 2230/60* (2013.01); *F16H 1/06* (2013.01); *F16H 57/025* (2013.01); *F16H 57/029* (2013.01); *F16J 15/322* (2013.01); *F16J 15/3204* (2013.01); *F16J 15/3232* (2013.01); *F16J 15/3268* (2013.01)

(58) Field of Classification Search
USPC ................. 277/549, 551, 562, 568; 74/413
See application file for complete search history.

(56) References Cited

U.S. PATENT DOCUMENTS

| | | | |
|---|---|---|---|
| 5,303,935 A | 4/1994 | Saksun | |
| 6,095,780 A | 8/2000 | Ernens | |
| 2013/0300068 A1* | 11/2013 | Fangauf | F16J 15/32 277/549 |
| 2014/0062031 A1* | 3/2014 | Honzek | F16J 15/168 277/551 |
| 2014/0271136 A1* | 9/2014 | Creager | F02B 39/04 415/123 |

FOREIGN PATENT DOCUMENTS

| | | |
|---|---|---|
| CN | 101737302 A | 6/2010 |
| CN | 102367873 A | 3/2012 |
| DE | 202006012677 U1 | 11/2006 |
| GB | 862553 | 3/1961 |
| GB | 1081869 | 9/1967 |
| GB | 2082681 | 3/1982 |
| JP | S348608 U | 6/1959 |
| JP | 55135806 U | 9/1980 |
| JP | S5776295 A | 5/1982 |
| JP | S60-101364 | 6/1985 |
| JP | S60-101365 A | 6/1985 |

OTHER PUBLICATIONS

Chinese First Office Action in corresponding Chinese Application No. 201680059462.8, dated Jun. 27, 2019.

European Communication in corresponding European Application No. 16826696.3—1015/3359850, dated Nov. 28, 2019.

* cited by examiner

METHOD FOR INSTALLING A TRANSMISSION AND SHAFTSEAT APPLIED THEREBY

The present invention relates to a method for installing a transmission.

More specifically the invention relates to a transmission between a drive with driveshaft, such as for example a combustion engine or similar, and a load with a driven shaft, such as a compressor element for example.

BACKGROUND OF THE INVENTION

Such a transmission, also called a 'transmission box', is provided with gears or similar that provide a coupling between the aforementioned driveshaft and driven shaft so that the compressor is driven by the combustion engine, whereby a suitable transmission ratio is realised so that the speed of the drive shaft is converted into a different speed of the driven shaft.

In order to obtain a good operation of the transmission, it is necessary to lubricate the gears or similar with oil or another lubricant. In the example of a drive of a compressor this can be done with the same oil as is needed for the lubrication and cooling of the compressor element.

To prevent the lubricant from able to leak away to the combustion engine, a shaft seal is provided around the driveshaft in the transmission.

This seal is of the 'lip seal' type for example, but can be any type of shaft seal that is usual for sealing rotating shafts.

In known installations, the lip seal is premounted in the transmission itself in a cavity or space provided to this end, for example in the housing of the transmission, whereby the lip seal is clamped in this cavity in a radial direction.

Then the transmission is affixed to the drive ensuring that the lip seal goes over the driveshaft of the drive.

A disadvantage is that an accumulation of tolerances in the construction of the drive and in the assembly of the transmission will ensure that the lip seal is not correctly aligned with respect to the driveshaft.

As a result the lip seal will be held around the driveshaft with a relatively large eccentricity.

This has the detrimental consequence that fatiguing can occur in the lip seal and/or that the lip seal will wear faster on one side, such that the seal is no longer optimum and can even leak.

Consequently, the lip seal must be replaced more quickly or lip seals of a better quality, and thus more expensive, must be used.

SUMMARY OF THE INVENTION

The purpose of the present invention is to provide a solution to at least one of the aforementioned and other disadvantages.

The object of the present invention is a method for installing a transmission between a drive with a driveshaft and a load with a driven shaft, whereby this transmission comprises a housing and at least a drive gear and a driven gear, whereby the method consists of first affixing the transmission over the driveshaft and fastening the housing of the transmission to the housing of the drive and then affixing a shaft seal over the driveshaft.

The shaft seal can be a seal of the lip seal type, for example, but this is not necessary for the invention.

An advantage is that due to the clamping force of the lip seal around the driveshaft, the lip seal will sit concentrically around the driveshaft.

As a result uneven wear of the lip seal can be prevented. As a result of this the lip seal will have to be replaced less quickly, and a cheaper quality of lip seal can be selected.

Moreover, an accumulation of tolerances in the construction of the drive and in the assembly of the transmission will not affect the alignment or the positioning of the lip seal with respect to the driveshaft.

In the housing of the transmission a space or cavity is provided in which the lip seal arrives when it is affixed over the driveshaft. This space or cavity is made larger than the actual dimensions of the lip seal, so that a radial clearance remains that can accommodate the tolerances in the construction of the drive and in the assembly of the transmission.

Because the transmission is first mounted around the driveshaft, without the lip seal being radially clamped and premounted in the transmission, and due to the presence of the aforementioned radial clearance, the tolerances in the construction of the drive and in the assembly of the transmission will not affect the positioning of the lip seal.

Preferably, after affixing a shaft seal over the driveshaft, the method also comprises the step of axially clamping the lip seal.

The invention also concerns a shaft seal that essentially consists of a ring-shaped housing.

Preferably the shaft seal is of the lip seal type, whereby the ring-shaped housing is provided with one or more lips that are provided on the side of the ring-shaped housing oriented towards the centre of the ring shape and which extend over the periphery of the ring-shaped housing.

The ring-shaped housing also comprises two sides that extend in the radial direction or approximately in the radial direction. It is on these sides where a clamping force will be exerted in the method according to the invention.

The sides of the ring-shaped housing that extend in the radial direction or approximately in the radial direction means the sides that extend perpendicularly or approximately perpendicularly to the side oriented towards the centre of the ring shape.

The ring-shaped housing of the shaft seal according to the invention comprises a sealing ring, whereby the sealing ring is placed in a groove that extends in the radial direction or approximately radial direction, and which is integrated in a side of the ring-shaped housing.

This sealing ring can be of the O-ring type, but this is not necessarily the case. When an O-ring is mentioned in the following it means any suitable type of sealing ring.

Such a shaft seal is particularly suitable for use in a method according to the invention.

As in the method according to the invention the shaft seal is no longer clamped in radially because a radial clearance is provided in the space or cavity in the housing of the transmission where the shaft seal is affixed, oil leakage paths will occur along the shaft seal from the transmission to the drive via this clearance.

In order to close off these leakage paths the aforementioned O-ring will ensure a seal when the shaft seal is clamped axially, so that the O-ring placed in the groove is clamped between the shaft seal and the housing of the transmission.

BRIEF DESCRIPTION OF THE DRAWINGS

With the intention of better showing the characteristics of the invention, a few preferred variants of a method according to the invention and a lip seal thereby applied are described hereinafter, by way of an example without any limiting nature, with reference to the accompanying drawings, wherein.

DETAILED DESCRIPTION OF THE INVENTION

Figure 1:
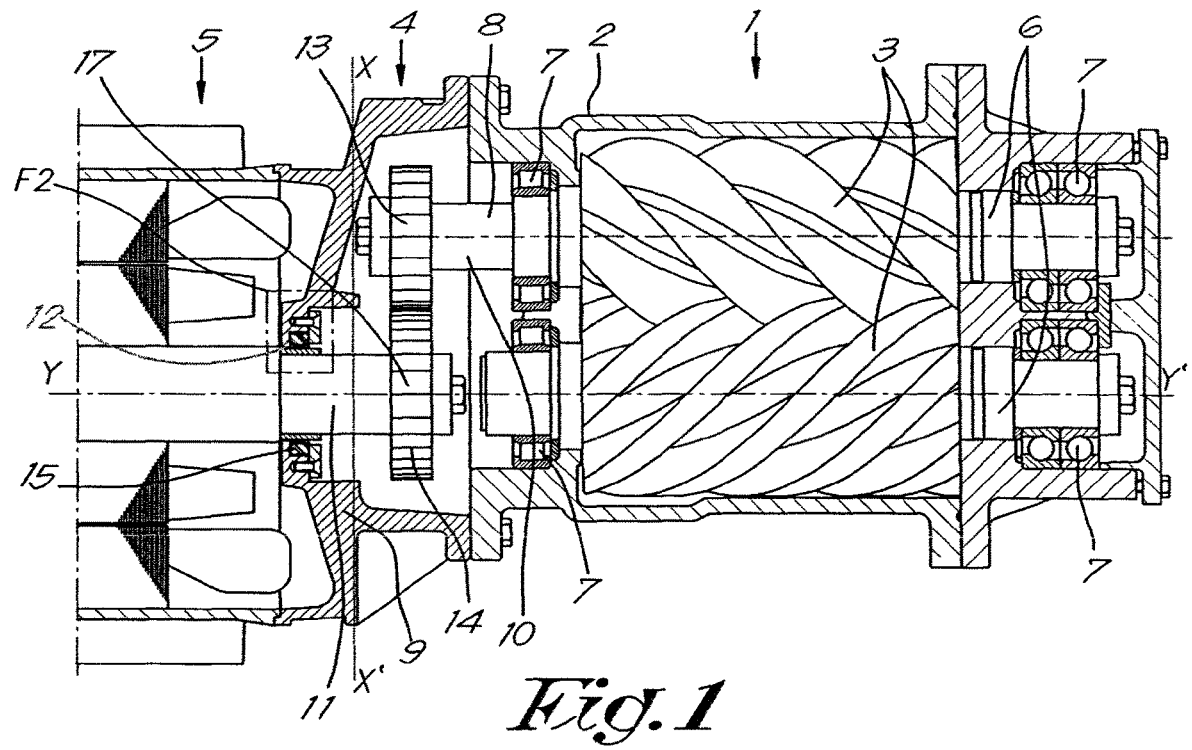
FIG. 1 schematically shows a compressor element with a drive that is provided with a transmission with a lip seal according to the invention.

The compressor element 1 schematically shown in FIG. 1 essentially comprises a housing 2 with two meshed rotors 3 therein, in this case screw rotors.

The compressor element 1 is coupled to a transmission 4, which in turn is coupled to a drive 5, in this case an engine.

It is clear that the invention is not limited to compressor elements 1 or an engine, but any type of machine that must be driven by a drive 5 using a transmission 4 belongs to the scope of the invention.

The aforementioned rotors 3 are provided with a shaft 6, whereby these shafts 6 are mounted on bearings 7 in the housing 2.

One of these shafts 6 extends along one end 8 through the housing 2 into the transmission 4.

The transmission 4 comprises a housing 9 in which the aforementioned end 8 of this one shaft 6 is affixed, that will act as the driven shaft 10.

The drive 5 is further provided with a driveshaft 11. This driveshaft 11 extends from the aforementioned drive 5 into the housing 9 of the transmission 4 via a borehole 12 provided in the housing 9 to this end.

The driveshaft 11 is provided with a drive gear 14 that can mesh with a driven gear 13 that is provided on the driven shaft 10.

In order to ensure that the aforementioned borehole 12 is sufficiently closed, a lip seal 15 is placed in the transmission 4 around the driveshaft 11 at the location of the borehole 12.

According to the invention it is not excluded that instead of a lip seal 15, another type of shaft seal is used. Everything that follows is in principle applicable to shaft seals of a different type to a lip seal 15.

To this end a method for installing a transmission according to the invention is applied, that will be described below on the basis of FIG. 1 and FIG. 2, which shows a detail of FIG. 1.

In a first optional step, a bush 16 is affixed around the driveshaft of the engine.

Bush 16 here means a sleeve-shaped lining that is affixed over the free end 17 of the driveshaft 11.

This bush 16 is affixed at the location where the lip seal 15 goes in one of the following steps of the method according to the invention, as described below.

Then if need be it is ensured that the driveshaft 11 is coupled to the drive 5 or a flywheel of the drive 5, as is well known.

However, it is not excluded that this is done before affixing the aforementioned bush 16.

In a next step, according to the invention, the transmission 4 is affixed over the driveshaft 11 and the housing 9 of the transmission 4 is fastened to the housing of the drive 5.

Then, according to the invention, the lip seal 15 is affixed over the driveshaft 11.

As can be seen in the drawings, to this end a borehole 18 is provided in the housing 9 of the transmission 4 that creates a space or cavity to be able to affix the lip seal 15, whereby this borehole 18 is larger in the radial direction X-X' than the dimensions of the lip seal 15. As a result of this, a radial clearance 19 occurs around the lip seal 15.

Furthermore, it can be seen in the drawings that the lip seal 15 is affixed over the bush 16, and that the lip seal 15 according to the invention centres itself around this bush 16 and thus around the driveshaft 11.

Then the lip seal 15 can be fastened. Preferably the lip seal 15 is clamped axially, i.e. the clamping force is oriented in the axial direction Y-Y'.

In order to be able to realise this, the axial dimension of the borehole 18, i.e. the depth of the borehole 18 in the axial direction Y-Y', is taken to be somewhat smaller than the axial dimension of the lip seal 15, i.e. the thickness of the lip seal 15 in the axial direction Y-Y'.

The lip seal 15 thus protrudes somewhat out of the housing 9 of the transmission 4 in the axial direction Y-Y'. This ensures that a clamping force is exerted on the lip seal 15 and not on the housing 9 of the transmission 4.

Figure 2:
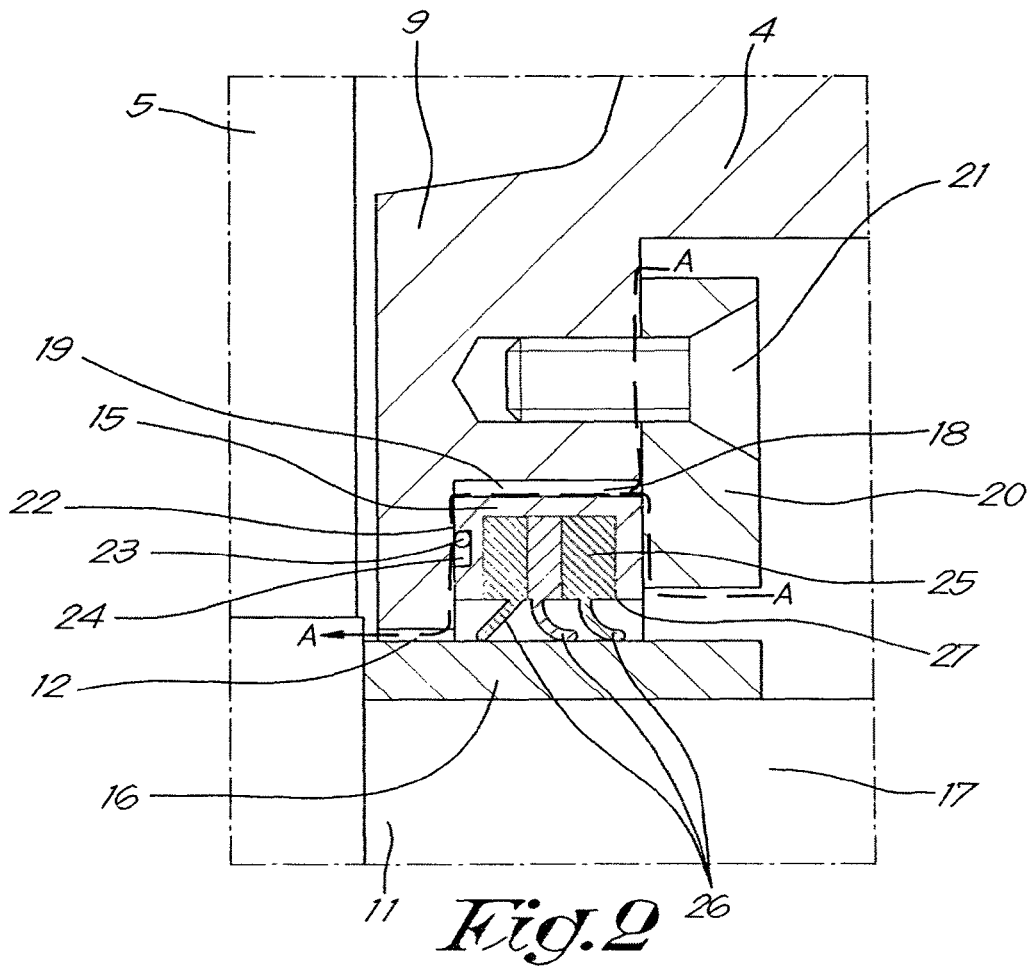
FIG. 2 shows the section that is shown by F2 in FIG. 1 on a larger scale.

In the example shown, this axial clamping of the lip seal 15 is realised by making use of a clamping plate 20 that is fastened in the axial direction Y-Y' against the lip seal 15 and the transmission 4, in particular the housing 9 of the transmission 4, as shown in FIG. 2.

In this case the clamping plate 20 is constructed as a clamping ring that is fastened with a number of screws 21 that are distributed along the periphery of the clamping ring.

It is clear that this clamping plate 20 does not have to be a ring, but for example can also comprise one or more clamping plates 20 that are fastened at certain locations against the transmission 4 to clamp the lip seal 15 at these locations.

The axial clamping can be easily realised, in contrast to radial clamping, which in a method according to the invention is difficult to apply or even not applicable.

It is clear that any other clamping mechanism can be used for the axial clamping of the shaft seal 15, without departing from the scope of the invention.

After the lip seal 15 has been affixed, preferably the drive gear 14 is affixed on the driveshaft 11.

Figure 3:
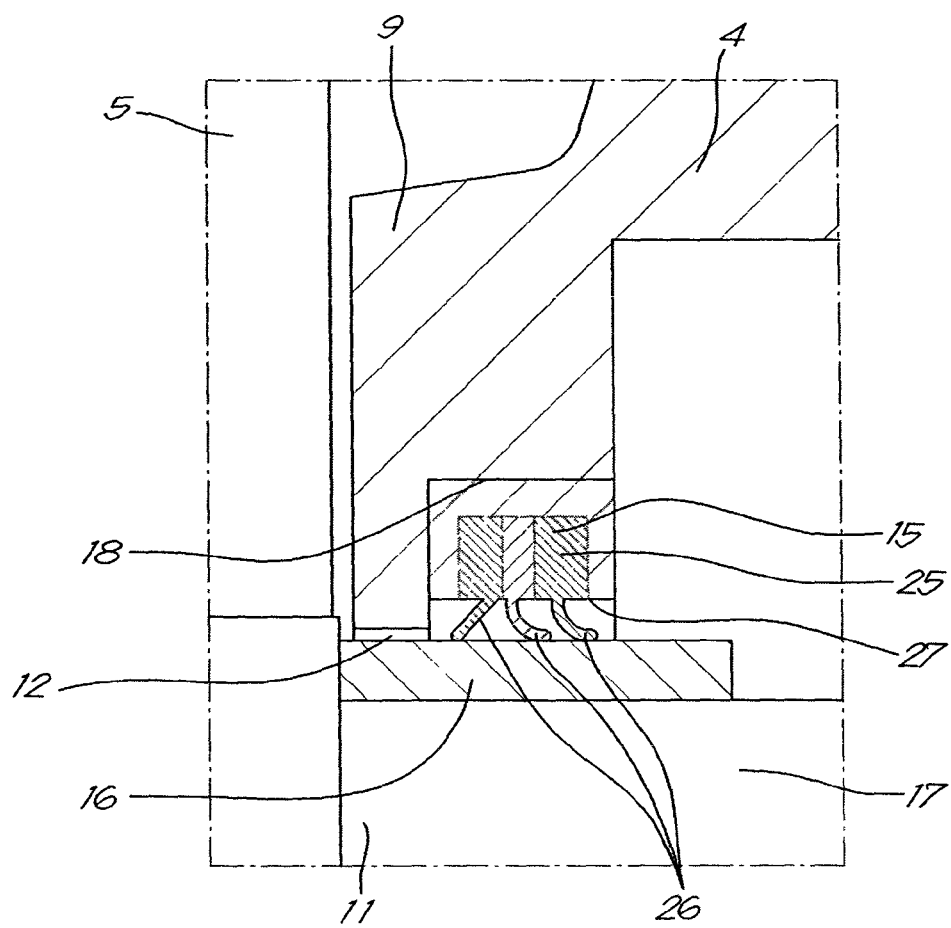
FIG. 3 shows a variant of FIG. 2 according to the known state of the art.

FIG. 3 shows a lip seal 15 that is affixed according to a known method.

In a known method the lip seal 15 is clamped radially in the transmission 4, more specifically in the housing 9 of the transmission 4, in a borehole 18 provided to this end, whereby this borehole 18 is somewhat smaller than the dimensions of the lip seal 15 so that a radial clamping force is realised, i.e. that the clamping force is oriented in a radial direction X-X'.

By applying a method according to the invention it is very difficult, if not impossible, to be able to properly clamp the lip seal 15 into a borehole 18 radially, after the transmission 4 has already been affixed over the driveshaft 11. Even if the lip seal 15 is clamped in the borehole 18, the lip seal 15 is indeed centric in the borehole 18 of the housing 9 of the transmission, but eccentric with respect to the driveshaft 11, which is not the intention.

As already mentioned, a radial clearance 19 occurs around the lip seal 15 because the lip seal 15 is not clamped in radially.

As a result two leakage paths are created along which oil can leak from the transmission 4 to the drive 5. It is important to close off these leakage paths to prevent this.

These two leakage paths are indicated in FIG. 2 by arrows A. These leakage paths go along via the clamping plate 20.

As can be seen in FIG. 2, these leakage paths merge in a radial clearance 19 and then continue to run together to the back 22 of the lip seal 15, i.e. to the side 22 of the lip seal 15 that extends in a radial direction or approximately in a radial direction and which is affixed against the transmission 4 or the housing 9 of the transmission 4.

In other words it is possible to provide one single sealing ring 23, such as, for example but not necessarily, an O-ring 23, on this aforementioned back 22 of the lip seal 15 to close off both leakage paths.

It is sufficient to provide a seal in the form of such an O-ring 23 to seal or interrupt the oil leakage path, whereby this O-ring 23 is placed in a groove 24 that is integrated in a side 22 of the lip seal 15 that extends in a radial direction or approximately in a radial direction, whereby this side 22 is intended to be affixed against the transmission 4 or the housing 9 thereof when mounting the lip seal 15.

To this end, a shaft seal 15 according to the invention is preferably used as shown in FIG. 2. The shaft seal 15 consists of a ring-shaped housing 25. As already mentioned, in this case but not necessarily, the shaft seal 15 is of the lip seal 15 type, whereby the ring-shaped housing 25 is provided with three lips 26 that are provided on the side 27 of the ring-shaped housing 25 that is oriented towards the centre of the ring shape, and which extend over the periphery of the ring-shaped housing 25, whereby the lip seal is provided with an O-ring 23, whereby the O-ring 23 is placed in a groove 24 provided to this end that is integrated in a side 22 of the ring-shaped housing 25 that extends in a radial direction or approximately radial direction.

Due to the axial clamping with the aid of the clamping plates 20, the O-ring 23 will be pressed between the transmission 4 and the lip seal 15 so that a seal is realised that will ensure that no further oil can leak.

Figure 4:
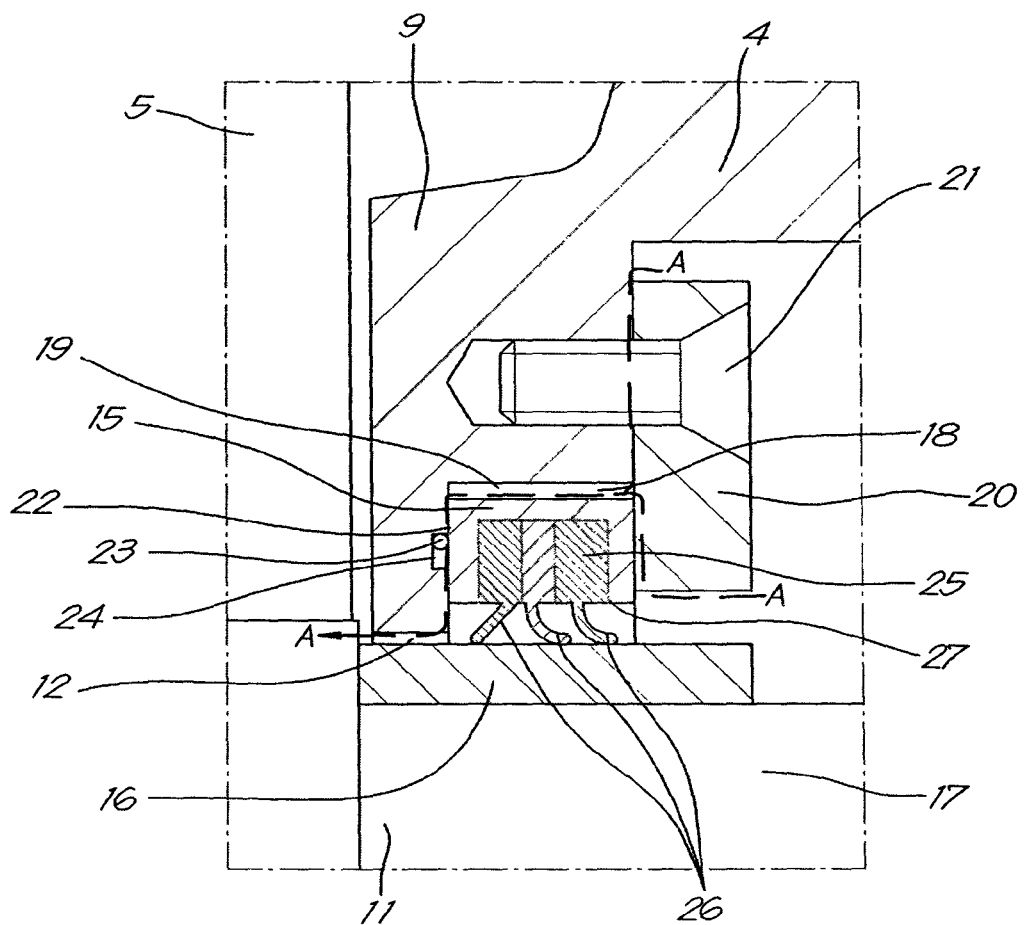
FIG. 4 shows a variant of FIG. 2 whereby the O-ring is affixed in the housing of the transmission.

As an alternative to the solution of FIG. 2, it is also possible to close off the leakage paths by providing a groove 24 with a single O-ring 23 in the housing 9 of the transmission 4 at a location against which a side 22 of the shaft seal 15, that extends in the radial direction X-X' or approximately the radial direction X-X', will go. This is shown in FIG. 4. This solution can be applied with a standard lip seal 15. However, a disadvantage is that the making of the groove 24 in the housing 9 is technically more difficult. The affixing of the O-ring 23 in this groove 24 at this location will also be more difficult to implement on account of the limited space.

Figure 5:
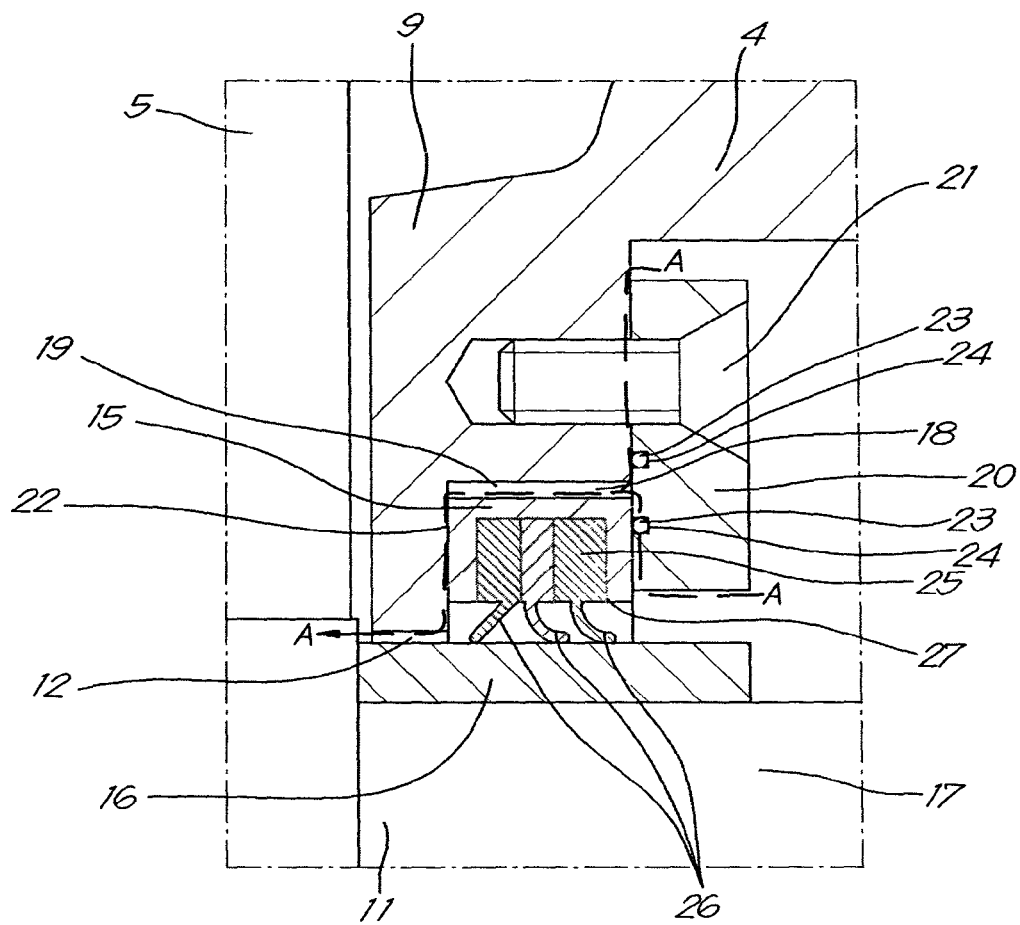
FIG. 5 shows a variant of FIG. 2 whereby two O-rings are placed in the clamping plate.

Another alternative consists of closing off the leakage paths before they merge, by providing two grooves 24 each with an O-ring 23 in the clamping plate, as shown in FIG. 5. Hereby one groove 24 with an O-ring 23 will be situated at the location of the lip seal 15 and one groove 24 with O-ring 23 at the location of the housing 9 of the transmission 4. Although the solution of FIG. 5 is relatively easy to implement, whereby a standard lip seal 15 can be used, two O-rings 23 do indeed have to be provided.

Note that in principle it is also possible to seal off the leakage paths in the radial clearance 19. However, affixing an O-ring 23 there is not a good solution because the lip seal is eccentric with respect to the borehole 18 in the housing 9 of the transmission 4. As a result of this eccentricity it will be difficult to clamp in the O-ring properly to obtain a good seal.

The present invention is by no means limited to the embodiments described as an example and shown in the drawings, but such a method and a lip seal can be realised according to different variants without departing from the scope of the invention.

The invention claimed is:

1. A method for installing a transmission between a drive with a driveshaft and a load with a driven shaft, wherein the transmission comprises a housing with a borehole for the driveshaft and a cavity for fixing a shaft seal around the driveshaft to prevent oil leakage from the transmission to the drive and at least a drive gear to be mounted on the driveshaft and a driven gear mounted on the driven shaft, wherein the method comprises the following steps:

affixing the housing of the transmission over the driveshaft with the driveshaft extending through the borehole in the housing;

fastening the housing of the transmission to a housing of the drive;

affixing the shaft seal over the driveshaft, the shaft seal having a smaller radial length than the cavity in the housing so that a radial clearance remains between the shaft seal and the transmission that allows a self centering of the shaft seal around the driveshaft to accommodate tolerances in construction of the drive and in the assembly of the transmission when installing the shaft seal;

affixing the shaft seal over the driveshaft, with an axial clamping of the shaft seal to the housing, wherein a depth of the cavity in an axial direction is smaller than an axial length of the shaft seal; and affixing the drive gear on the driveshaft, wherein for the axial clamping of the shaft seal at least one clamping plate is fastened in an axial direction against the shaft seal to the transmission so that at least an axial clamping force is exerted on the shaft seal.

2. The method according to claim 1, wherein, before the shaft seal is mounted on the driveshaft, a bush is affixed over the driveshaft at a location where the shaft seal goes.

3. The method according to claim 1, wherein an at least one extra seal is provided in the form of a sealing ring to seal or interrupt an oil leakage path through the clearance.

4. The method according to claim 3, wherein the at least one sealing ring is placed in a groove provided to an end that is integrated in a side of the shaft seal that extends in a radial direction or approximately radial direction, whereby a side is intended to be affixed against the transmission or the housing thereof when the shaft seal is mounted.

5. The method according to claim 3, wherein the at least one extra sealing ring is placed in a groove provided to an end that is integrated in the housing of the transmission at a location against which a side of the shaft seal that extends in a radial direction or approximately radial direction will go.

6. The method according to claim 3, wherein the extra seal is provided in the form of at least two sealing rings, whereby the sealing rings are O-rings that are placed in grooves provided to this end in the clamping plate.

7. The method according to claim 3, wherein the at least one or more sealing rings are O-rings.

8. The method according to claim 1, wherein the shaft seal is a lip seal.

9. The method according to claim 1, wherein the drive is a combustion engine and the driven shaft is a shaft of a rotor of a compressor element.

10. A transmission between a drive with a driveshaft and a load with a driven shaft, said transmission comprising:
- a housing fastened to the drive, comprising a borehole for the driveshaft extending through said borehole;
- a shaft seal mounted around the driveshaft to prevent oil leakage from the transmission to the drive;
- the shaft seal being provided in a cavity of the housing of the transmission;
- a drive gear on the driveshaft and a driven gear on the driven shaft,
- wherein a radial length of the shaft seal is smaller than a radial length of the cavity in the housing so that a radial clearance remains between the shaft seal and the transmission around the shaft seal, the shaft seal being a self centering shaft seal to accommodate tolerances in construction of the drive and in the assembly of the transmission and the shaft seal being axially clamped to the transmission, and a depth of the cavity in an axial direction is smaller than an axial length of the shaft seal; and
- wherein the shaft seal is axially clamped by at least one clamping plate that is fastened in the axial direction against the shaft seal and the transmission.

11. The transmission according to claim 10, wherein the shaft seal consists essentially of a ring-shaped housing, wherein the shaft seal is provided with a sealing ring, whereby the sealing ring is placed in a groove that is integrated in a side of the ring-shaped housing that extends in a radial direction or approximately radial direction.

12. The transmission according to claim 11, wherein the sealing ring is an O-ring.

13. The transmission according to claim 11, wherein the shaft seal is a lip seal, wherein the ring-shaped housing is provided with one or more lips that are provided on a side of the ring-shaped housing that is oriented towards the center of the ring shape and which extend over the periphery of the ring-shaped housing.

14. The transmission according to claim 10, wherein an at least one extra seal is provided in the form of a sealing ring to seal or interrupt an oil leakage path through the clearance.

15. The transmission according to claim 14, wherein the at least one sealing ring is placed in a groove provided to an end that is integrated in a side of the shaft seal that extends in a radial direction or approximately radial direction, whereby this side is configured to be affixed against the transmission or the housing thereof when the shaft seal is mounted.

16. The transmission according to claim 14, wherein the at least one extra sealing ring is placed in a groove provided to an end that is integrated in the housing of the transmission at a location against which a side of the shaft seal that extends in a radial direction or approximately radial direction will go.

17. The transmission according to claim 14, wherein the extra seal is provided in the form of an at least two sealing rings, whereby the sealing rings are O-rings that are placed in grooves provided to this end in the clamping plate.

18. The transmission according to claim 10, wherein the shaft seal is a lip seal.

19. The transmission according to claim 10, wherein the drive is a combustion engine and the driven shaft is a shaft of a rotor of a compressor element.

\* \* \* \* \*